US012718710B2

(12) United States Patent
Kremmel

(10) Patent No.: US 12,718,710 B2
(45) Date of Patent: Aug. 25, 2026

(54) BADGE FOR AN APPLIANCE

(71) Applicant: Haier US Appliance Solutions, Inc., Wilmington, DE (US)

(72) Inventor: Aldo Vincent Kremmel, Palmyra, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 102 days.

(21) Appl. No.: 18/795,590

(22) Filed: Aug. 6, 2024

(65) Prior Publication Data

US 2026/0045181 A1 Feb. 12, 2026

(51) Int. Cl.
*G09F 3/08* (2006.01)

(52) U.S. Cl.
CPC ..................................... *G09F 3/08* (2013.01)

(58) Field of Classification Search
CPC ........................................................ G09F 3/08
USPC ......... 24/455, 457, 458, 460, 461, 470, 477, 24/519; 40/1.5, 607.13, 607.14, 607.15, 40/620, 622, 662; 283/72, 74, 79, 81, 98, 283/99
See application file for complete search history.

(56) References Cited

U.S. PATENT DOCUMENTS 6,581,311 B1 * 6/2003 Davey .................. B60R 13/005 296/214
10,144,365 B2 12/2018 Lobo et al.
2005/0156408 A1 * 7/2005 Amamori .......... B60R 21/21656 280/728.3

FOREIGN PATENT DOCUMENTS

KR 20050032375 A 4/2005
KR 100551178 B1 2/2006

* cited by examiner

*Primary Examiner* — Justin V Lewis
(74) *Attorney, Agent, or Firm* — Dority & Manning, P.A.

(57) ABSTRACT

An appliance includes an external panel. The external panel defines at least one aperture. The appliance includes a badge coupled with the external panel. The badge includes a rear surface that interfaces the external panel and an arm coupled with the rear surface. The arm is received by the at least one aperture. The arm comprises at least one barb that provides tactile feedback. The badge further includes at least one compression rib extending towards the external panel. The at least one compression rib is coupled with the rear surface. The at least one compression rib biases the badge away from the external panel.

19 Claims, 6 Drawing Sheets

BADGE FOR AN APPLIANCE

FIELD OF THE INVENTION

The present subject matter relates generally to badges for external panels of appliances and, more specifically, to methods of coupling a badge to an external panel of a dishwashing appliance.

BACKGROUND OF THE INVENTION

Household appliances generally include a badge that indicates a brand of the appliance. Badges can be mounted to an external panel of the appliance. The badge may be secured with the external panel of the appliance using a simple adhesive.

Generally, a badge lets consumers know what quality of an appliance they are purchasing. Thus, badges can be a vital part of the appliance. Unsecure badges connected with the external panel of the appliance can leave a residue, and a missing badge does not indicate the brand of the appliance. A badge that properly secures with an appliance would be advantageous.

BRIEF DESCRIPTION OF THE INVENTION

Aspects and advantages of the invention will be set forth in part in the following description, or may be apparent from the description, or may be learned through practice of the invention.

In one example embodiment, an appliance includes an external panel. The external panel defines at least one aperture. The appliance includes a badge coupled with the external panel. The badge includes a rear surface that interfaces the external panel and an arm coupled with the rear surface. The arm is received by the at least one aperture. The arm comprises at least one barb that provides tactile feedback. The badge further includes at least one compression rib extending towards the external panel. The at least one compression rib is coupled with the rear surface. The at least one compression rib biases the badge away from the external panel.

In another example embodiment, a badge for an appliance includes an external panel. The external panel defines at least one aperture. The badge includes a rear surface interfaced with the external panel of the appliance and an arm coupled with the rear surface. The at least one aperture of the external panel is configured to receive the arm. The badge further includes at least one compression rib coupled with the rear surface and extending towards the external panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
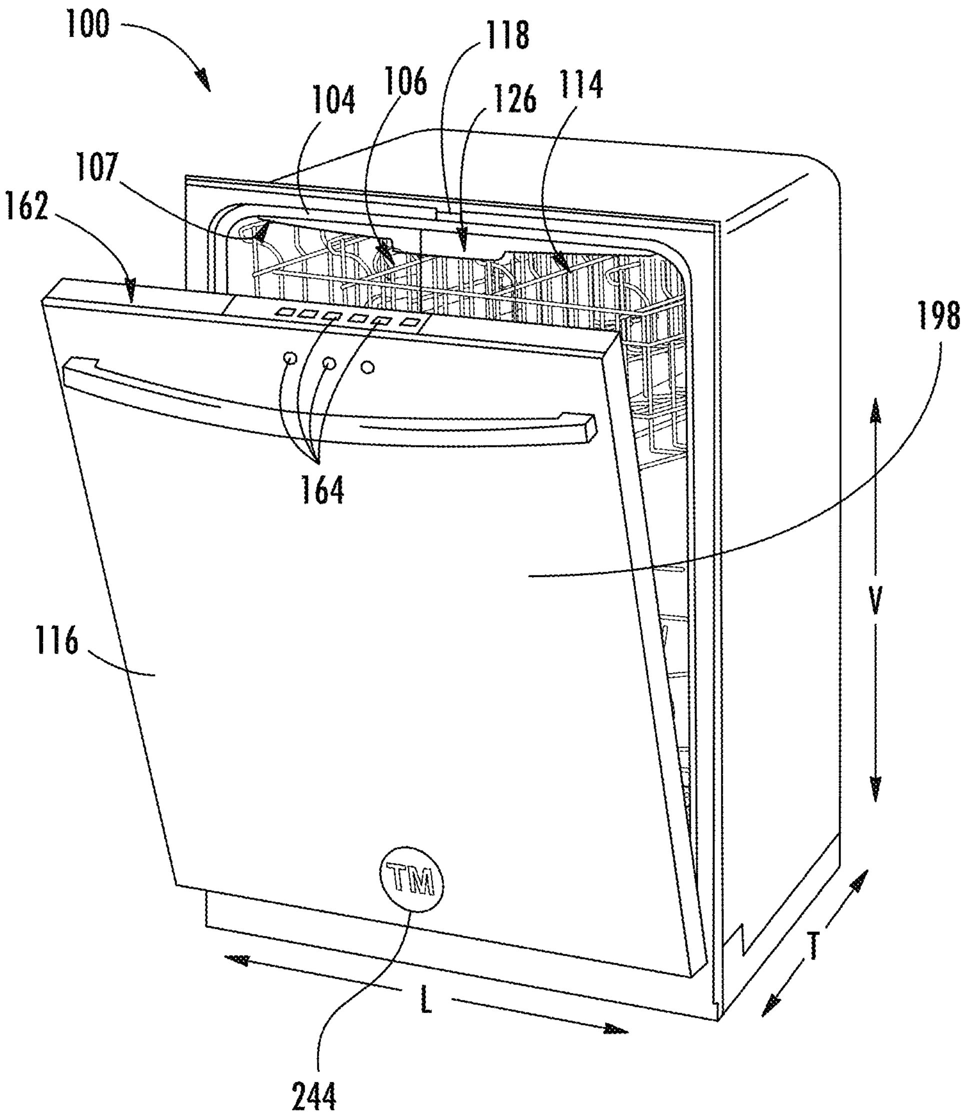
FIG. 1 provides a perspective view of an example embodiment of an appliance having a badge of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in an appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, and/or a drain cycle. The term "wash fluid" refers to a liquid used for washing and/or rinsing the articles and is typically made up of water that may include other additives such as detergent or other treatments.

The appliance described herein may generally refer to a dishwasher appliance; however, the appliance may be, for example, a clothes washing machine, a refrigerator, a freezer, a trash compactor, a stand mixer, or other appliance that may commonly include a badge. The example badge illustrated in the figures includes a generic trademark emblem; however, the appliance described herein may generally refer to any emblem or symbol.

Figure 2:
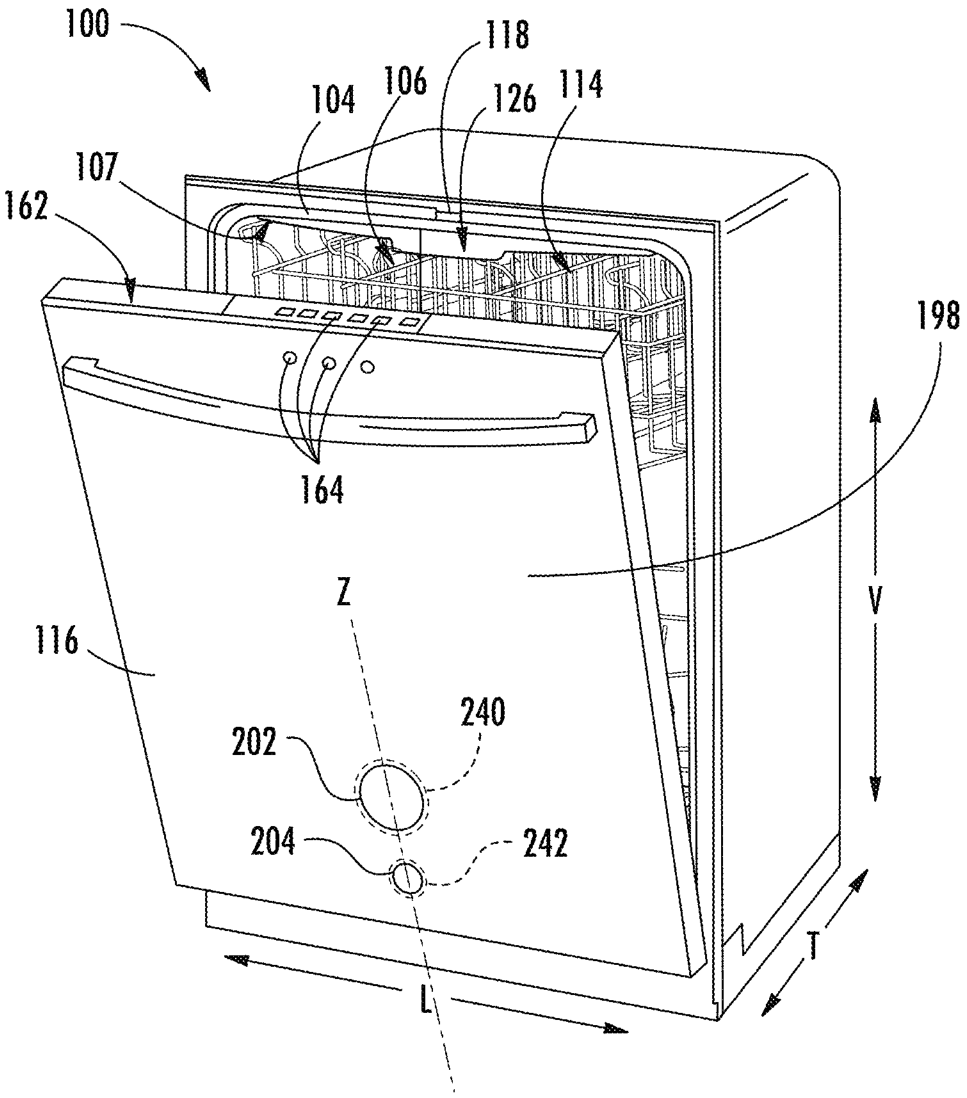
FIG. 2 provides a perspective view of the example appliance of FIG. 1 defining at least one aperture.
Figure 3:
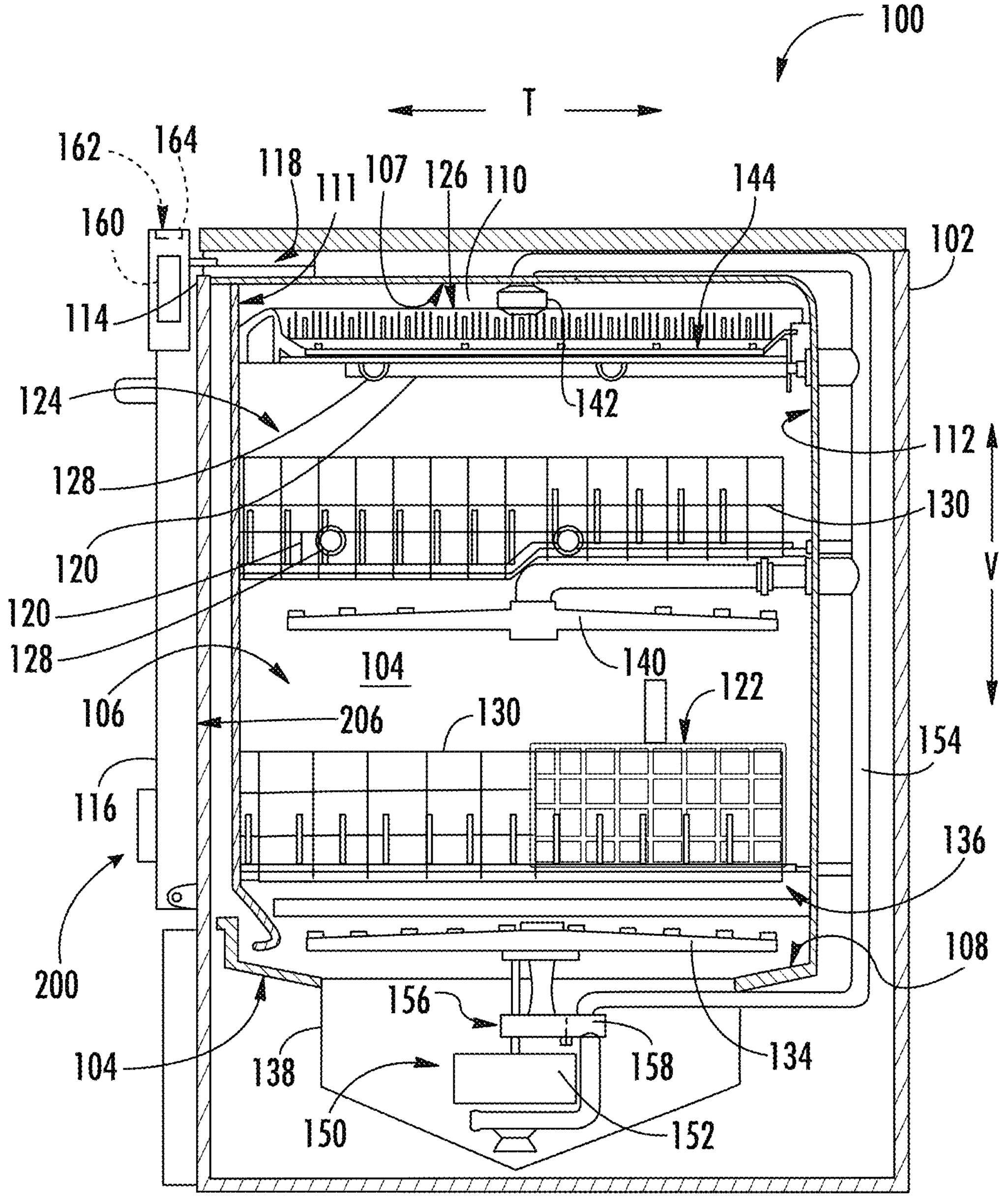
FIG. 3 provides a side, cross-sectional view of the example appliance of FIG. 1.

FIGS. 1 and 2 depict an example domestic dishwasher or appliance 100 that may be configured in accordance with aspects of the present disclosure. For the example embodiment of FIGS. 1 and 2, the appliance 100 includes a cabinet 102 (FIG. 2) having a tub 104 therein that defines a wash chamber 106 for receipt of articles 94 for washing. As shown in FIG. 2, tub 104 extends between a top 107 and a bottom 108 along a vertical direction V, between a pair of opposing side walls 110 along a lateral direction L, and between a front side 111 and a rear side 112 along a transverse direction T. Each of the vertical direction V, lateral direction L, and transverse direction T are mutually perpendicular to one another.

In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

The tub 104 includes a front opening 114 and a door 116 hinged at its bottom 117 for movement between a normally closed vertical position (shown in FIG. 1), wherein the wash chamber 106 is sealed shut for washing operation, and a horizontal open position for loading and unloading of articles from the appliance 100. According to example embodiments, appliance 100 further includes a door closure mechanism or assembly 118 that is used to lock and unlock door 116 for accessing and sealing wash chamber 106.

At least one rack assembly is slidably positioned within wash chamber 106 and is configured for the receipt of articles for cleaning. For the example embodiment shown in FIG. 2, opposing tub sidewalls 110 accommodate a plurality of rack assemblies. More specifically, guide rails 120 may be mounted to (or formed as part of) sidewalls 110 for supporting a first rack assembly 122 (also referred to as a lower rack assembly 122), a middle rack assembly 124 (also referred to as a second rack assembly 124), and a third rack assembly 126 (also referred to as an upper rack assembly 126). As illustrated, upper rack assembly 126 is positioned at a top portion of wash chamber 106 above middle rack assembly 124, which is positioned above lower rack assembly 122 along the vertical direction V. Additional details regarding the upper rack assembly 126 will be provided herein. For this example embodiment, upper rack assembly 126 is supported on opposing sidewalls 110 by rails 120 but rails 120 could be supported on and attached to middle rack assembly 124 as well.

Each rack assembly 122, 124, 126 is adapted for movement along transverse direction T between an extended loading position (not shown) in which the rack is substantially positioned outside the wash chamber 106, and a retracted position (shown in FIGS. 1 and 2) in which the rack is located inside the wash chamber 106. This may be facilitated, for example, by rollers, or guide wheels 128 mounted onto rack assemblies 122, 124, 126, respectively. Although guide rails 120 and guide wheels 128 (also referred to as rollers) are illustrated herein as facilitating movement of the respective rack assemblies 122, 124, 126, it should be appreciated that any suitable sliding mechanism or member may be used according to alternative embodiments. In some embodiments, appliance 100 may accommodate a different number of rack assemblies and supporting guide rails. For example, appliance 100 may accommodate only first rack assembly 122 and upper rack assembly 126, with accompanying guide rails.

Some or all of the rack assemblies 122, 124, 126 may be fabricated into lattice, or grid, structures including a plurality of wires or elongated members 130 (for clarity of illustration, not all elongated members making up rack assemblies 122, 124, 126 are shown in FIG. 2). The plurality of wires or elongated members 130 may be either steel and stainless steel, and the wire may be coated with none, one, or more of nylon and polyvinyl chloride. Rack assemblies 122, 124, 126 are generally configured for guide rails 120 within wash chamber 106 while allowing a flow of wash fluid to reach and impinge on those articles, e.g., during a cleaning or rinsing cycle. For some embodiments, a silverware basket (not shown) is removably attached to a rack assembly, e.g., lower rack assembly 122, for placement of silverware, utensils, and the like, that are otherwise too small or delicate to be accommodated by rack 122.

At least one spray assembly is located in wash chamber 106 and is configured to direct wash fluids onto at least one rack assembly for washing articles located therein. For the example embodiment of FIG. 2, appliance 100 further includes a plurality of spray assemblies for urging a flow of water or wash fluid onto the articles placed within wash chamber 106. More specifically, as illustrated in FIG. 2, appliance 100 includes a first spray assembly 134 (also referred to as a lower spray arm assembly 134) disposed in a lower region 136 of wash chamber 106 and above a sump 158 so as to rotate in relatively close proximity to lower rack assembly 122. Similarly, a second spray assembly 140 (also referred to as a mid-level spray arm assembly 140) is located in an upper region 144 of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, an upper or third spray assembly 142 (also referred to as an upper spray assembly 142) may be located above upper or third rack assembly 126 along the vertical direction V. In this manner, third spray assembly 142 may be configured for urging and/or cascading a flow of wash fluid downward over rack assemblies 122, 124, and 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear side 112 of tub 104 along the vertical direction V to supply wash fluid throughout wash chamber 106. In some examples, a secondary supply conduit (not shown) may supply additional wash fluid to one or more various spray assemblies and manifolds.

As illustrated, primary supply conduit 154 is used to supply wash fluid to mid-level spray arm assembly 140. Diverter assembly 156 can allow selection between spray assemblies 134 and 140, 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary. Movement of the spray arm assemblies 134 and 140 and the spray from fixed manifolds like spray assembly 142 provides coverage of dishes, silverware, and other dishwasher contents to be cleaned with a washing spray. Other configurations of spray assemblies may be used as well. For example, appliance 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156, e.g., which is positioned within sump 138 of dishwasher appliance. Diverter assembly 156 may include a diverter disk (not shown) disposed within a diverter chamber (not shown) for selectively distributing the wash fluid to the spray assemblies 134, 140, 142 and/or other spray manifolds or devices. For example, the diverter disk may have a plurality of apertures that are configured to align with one or more outlet ports (not shown) at the top of diverter chamber (not shown). In this manner, the diverter disk may be selectively rotated to provide wash fluid to the desired spray device.

According to an example embodiment, diverter assembly 156 is configured for selectively distributing the flow of wash fluid from pump 152 to various fluid supply conduits, only some of which (e.g., 154) are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counterclockwise direction, a third conduit for spraying rack assembly 126 (shown in FIG. 2) as a silverware rack, and a fourth conduit for supplying only mid-level and/or upper spray assemblies 140, 142. Other configurations of diverter assembly 156 and/or other components (e.g., valves) may be used to allow various choices in the operation of the spray assemblies 134, 140, and 142 during a cleaning cycle.

The appliance 100 is further equipped with a controller 160 (FIG. 2) to regulate operation of the appliance 100. Controller 160 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout appliance 100. In the illustrated embodiment, the controller 160 may be located within a control panel area 162 of door 116. In such an embodiment, input/output ("I/O") signals may be routed between the control system and various operational components of appliance 100 along wiring harnesses that may be routed through the bottom of door 116. Typically, the controller 160 includes a user interface panel/controls 164 (FIG. 1) through which a user may select various operational features and modes and monitor progress of the appliance 100. In one embodiment, the user interface 164 may represent a general purpose I/O ("GPIO") device or functional block. In one embodiment, the user interface 164 may include input components, such as one or more of a variety of electrical, mechanical, or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of appliance 100. The example embodiment depicted in FIGS. 1 and 2 is for illustrative purposes only. For example, different locations may be provided for user interface 164, different configurations, including providing one or more rack assemblies 122, 124, 126 and one or more spray assemblies 134, 140, 142, to appliance 100 may be used, different configurations may be provided for rack assemblies 122, 124, 126, different spray assemblies 134, 140, 142 and spray manifold configurations may be used, and other differences may be applied while remaining within the scope of the present subject matter.

As may be generally seen in FIGS. 1 through 6, the appliance 100 comprises an external panel 198. The external panel 198 may generally be what a user of the appliance 100 commonly sees. The external panel 198 may have a first thickness T1. The external panel 198 may be made of a metallic material. Additionally, or alternatively, the external panel 198 may be made from a suitable polymeric material. The external panel 198 defines at least one aperture at least one aperture. For example, the at least one aperture is a first aperture 202 and a second aperture 204 (FIG. 2). The first aperture 202 may be larger than the second aperture 204, such that the first aperture 202 may accommodate larger insertions. The external panel 198 may include a first rim 240 at the first aperture 202. Additionally, or alternatively, the external panel 198 may include a second rim 242 at the second aperture 204. Additionally, or alternatively, the first aperture 202 may be specifically defined by the first rim 240. Additionally, or alternatively, the second aperture 204 may be specifically defined by the second rim 242.

The appliance 100 further comprises of badge 200 that is coupled with the external panel at the first aperture 202. The badge 200, and thus the first aperture 202, maybe located vertically down along the external panel 198, as illustrated in the example. Additionally, or alternatively, the badge 200 and the first aperture 202 may be located anywhere along the vertical direction V and the lateral direction L of the external panel 198.

Figure 4:
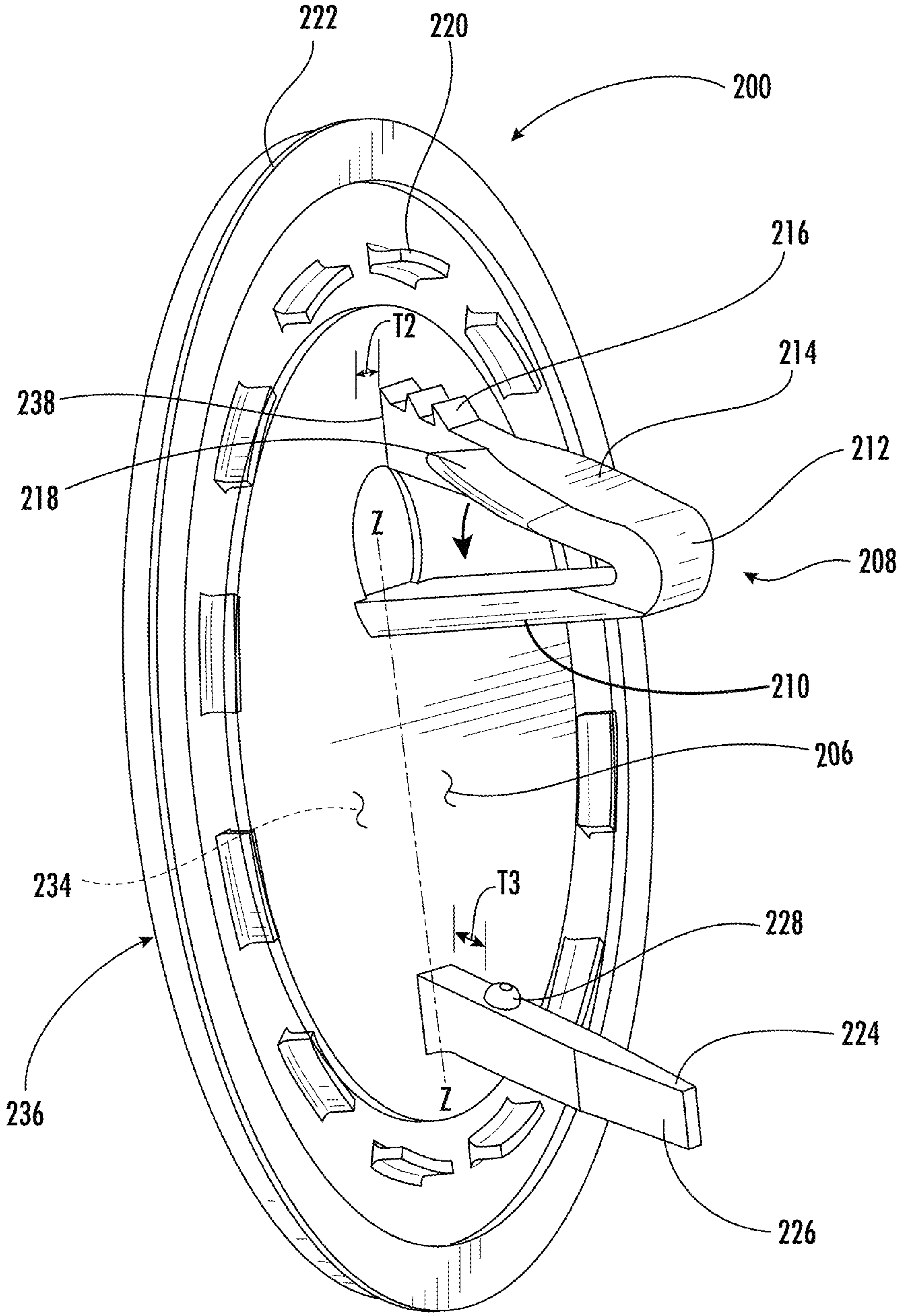
FIG. 4 provides a rear perspective view of the badge of the example appliance of FIG. 1
Figure 5:
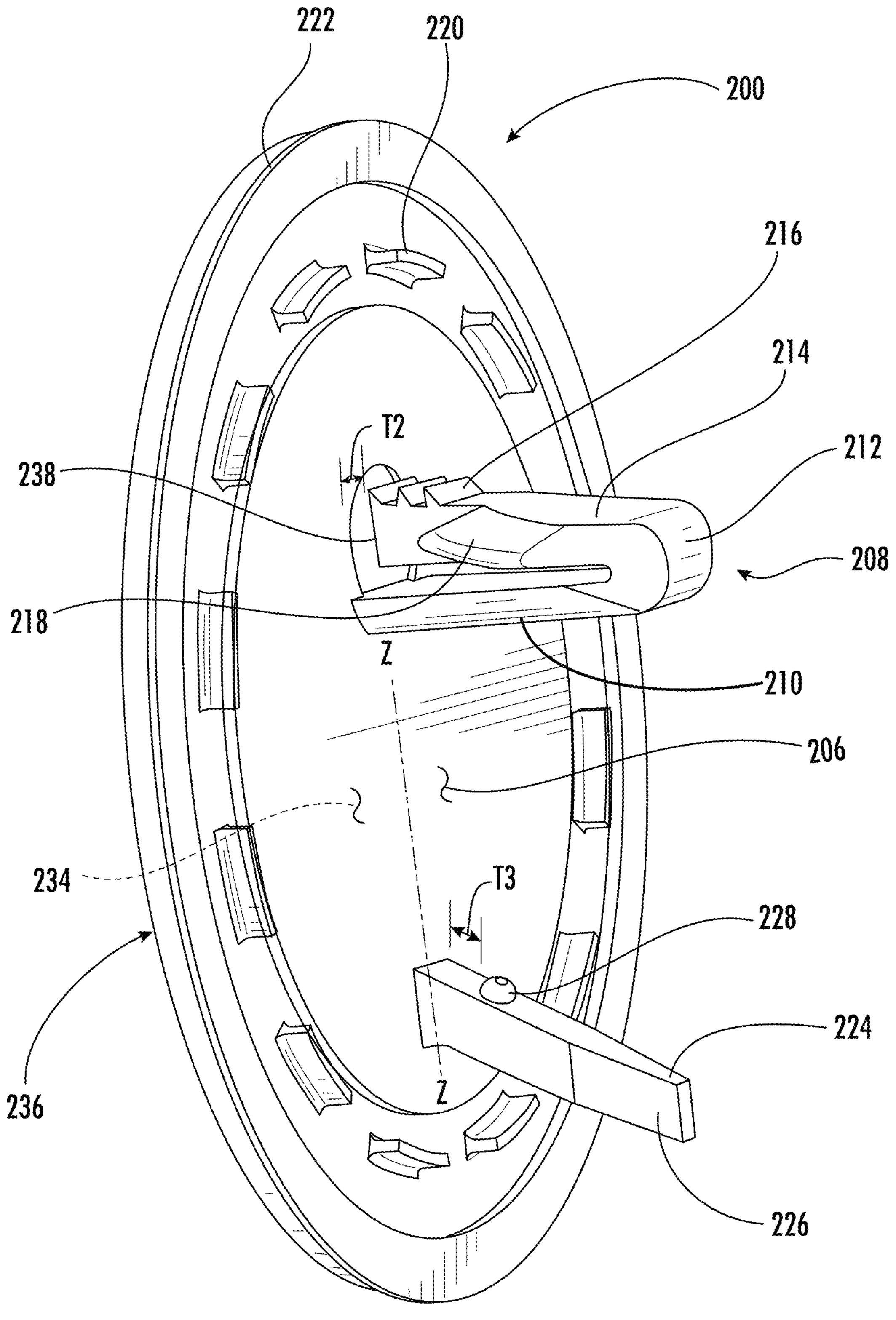
FIG. 5 provides a rear perspective view of the example badge having a dynamic arm in a retracted position of FIG. 4.

With reference to FIG. 4 and FIG. 5, the badge 200 defines a rear surface 206 that faces the external panel 198. The badge 200 further comprises an arm 208 coupled with the rear surface 206 of the badge 200. The arm 208 extends from the rear surface to 106 into the first aperture 202. The arm 208 includes a static member 210 coupled with the rear surface 206. The static member 210 may be generally orthogonal with the rear surface 206, for example. The arm 208 further comprises a living hinge 212 coupled with the static arm 210 distal rear surface 206. The arm 208 further comprises a dynamic member 214 coupled with the living hinge 212.

The living hinge 212 allows the dynamic member 214 to rotate, deflect, or bend about the living hinge 212 between an extended position, as illustrated in FIG. 4, and a retracted position, as illustrated in FIG. 5. The dynamic member 214 in the extended position may be non parallel with the static member 210. Additionally, or alternatively, the dynamic member 214 in the retracted position may be generally parallel with the static member 210. A free end 238 of the dynamic member 214 is spaced from the rear surface 206 by a second thickness T2. The second thickness T2 is greater than the first thickness T1. The dynamic member 214 may move, or rotate, to the corrected position while inserted into the first aperture 202. Additional, alternatively, the dynamic member 214 may rotate back to the extended position after being inserted into the first aperture 202.

The arm 208 may comprise at least one rachet shoulder 216 coupled with the dynamic member 214 proximal the free end 238. The at least one rachet shoulder 216 may comprise a plurality of barbs. The at least one rachet shoulder 216 may provide tactile feedback, or clicking, upon inserting through the first aperture 202 at the first rim 240 of the external panel 198. For example, the at least one rachet shoulder 216 may bend in response to engaging with the first rim 240, and the at least one rachet shoulder 216 may snap back to its original dimensions thus causing a click, or tactile feedback. In a further example, the plurality of rachet shoulders 216 may provide a respective plurality of clicks or tactile feedbacks to indicate the arm 208 is inserted into the at least aperture 202 such that the badge 200 is at least partially secured.

The arm 208 may further comprise at least one fin 218 coupled with the dynamic member 214. The fin 218 may extend laterally from the dynamic member 214. Additionally, or alternatively, the at least one fin 218 may compress when the dynamic member 214 engages with the first rim 240. In other words, the at least one fin 218 of dynamic member 214 engaged with the first rim 240 is compressed. Furthermore, the at least one fin 218 may decompress when the dynamic member 214 penetrates the first aperture 202 far enough such that the dynamic member 214 rotates from the retracted position to the extended position. In other words, the free end 238 of the dynamic member 214 in the extended position extends past the first rim 240.

The badge 200 may comprise a hook 224 coupled with the rear surface 206. The second aperture 204 may be configured to receive the hook 224. Additionally, or alternatively, the second aperture 204 may be configured to receive the hook 224 prior to the first aperture 202 receiving the arm 208. Generally, the hook 224 may be nonparallel with the arm 208. The hook 224, as illustrated, may generally be nonparallel with the static member 210 of the arm 208. Additionally, or alternatively, the hook 224 may be nonparallel with the dynamic member 214. Additionally, or alternatively, the hook 224 may extend away from the arm 208, as illustrated in the example.

The hook 224 may comprise a blade portion 226 distal the rear surface 206. The blade portion 226 may allow for ease of entry of the hook 224 into the second aperture 204. Additionally, or alternatively, the hook 224 may comprise a protrusion 228 configured to at least partially secure the hook 224 within the second aperture 204 of the external panel 198. For example, the external panel 198 may extend between and engage the rear surface 206 and the protrusion 228 of the hook 224 received by the second aperture 204. Therefore, the distance T3 between the rear surface 206 and the protrusion 228 is greater than the first thickness T1 of the external panel 198.

The badge 200 further comprises at least one compression rib 230. As illustrated, the at least one compression rib 230 may comprise a plurality of compression ribs. The plurality of compression ribs 230 extend from the rear surface 206 toward the external panel 198. The compression rib 230 biases the external panel 198 away from the rear surface 206 of the badge 200. The external panel 198 of the appliance 100 is at least partially secured between the compression rib 230 and the arm 208. For example, badge 200 may be at least partially secured with the external panel 198 by engaging the external panel 198 with the compression ribs 230 and the free end 238 of the dynamic member 214 of the arm 208 where the external panel 198 extends between the free end 238 and the compression ribs 230. Furthermore, the rear surface 206 of the badge 200 may include a periphery 222. Additionally, or alternatively, the plurality of compression ribs 230 may be arranged in an array proximal the periphery 222 of the rear surface 206 of the badge 200. As illustrated, each compression rib of the plurality of compression ribs 230 may extend circumferentially in the array. Additionally, or alternatively, each compression rib of the plurality of compression ribs 230 may extend radially in the array.

Figure 6:
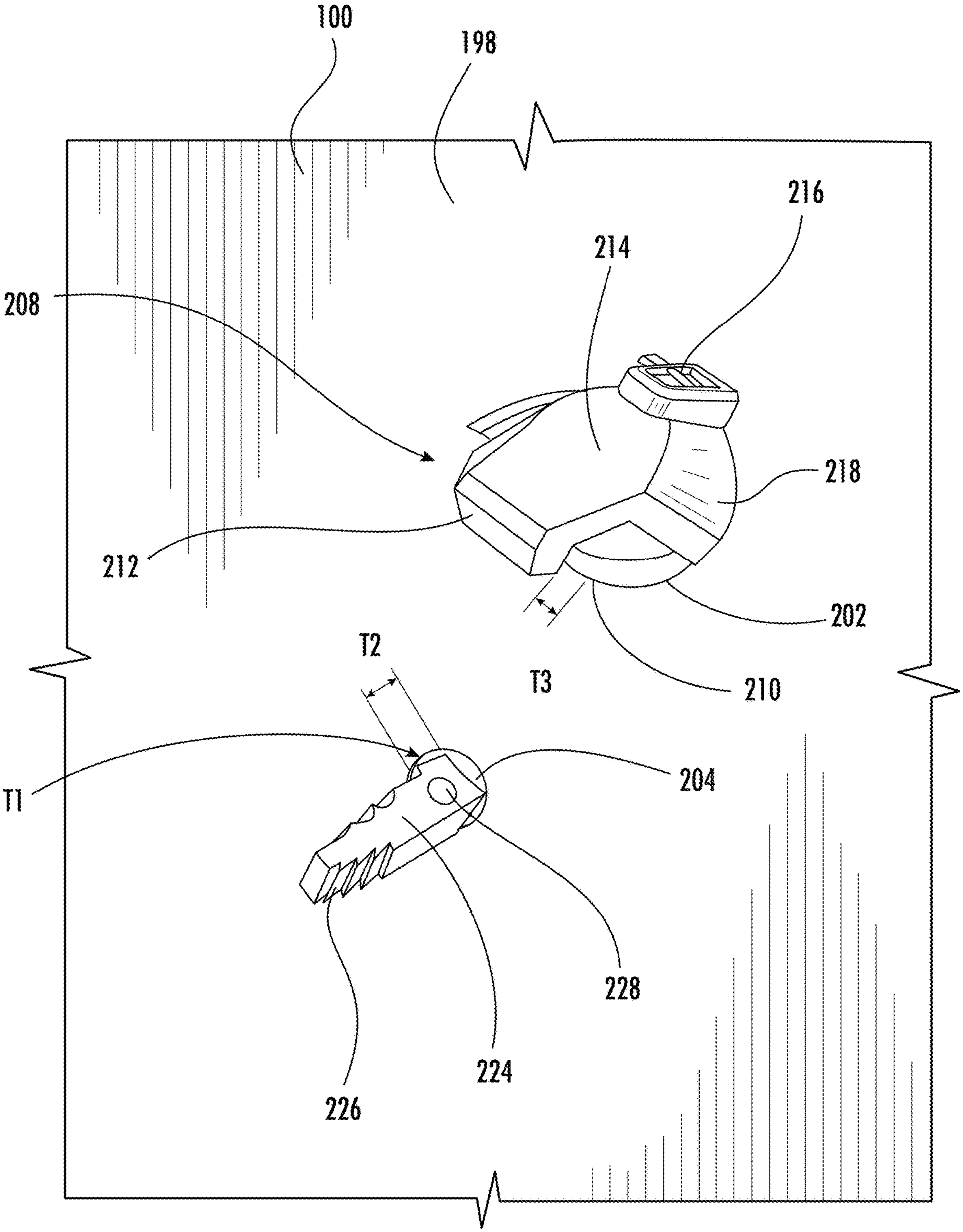
FIG. 6 provides a rear perspective view of the badge coupled with an external panel of the example appliance of FIG. 1.

With reference to FIG. 6 and as stated above, the first aperture 202 may be larger than the second aperture 204. Thus, the arm 208 may have a larger first cross-sectional area than a second cross-sectional area of the hook 224. Further more, the first aperture 202 and the second aperture 204 are aligned on a common plane Z. Thus, the arm 208 and the hook 224 of the badge 200 coupled with the appliance 100 are also aligned on the common plane Z. The common plane Z may extends along the vertical direction V and the transverse direction T, as illustrated in the example figures. Additionally, or alternatively, the common plane may be nonparallel with a vertical-transverse plane and a lateral-transverse plane.

With reference FIGS. 1-6, the badge 200 comprises an emblem 244 coupled with a front surface 234 defined by the badge 200. The emblem 244 may be a logo or other mark that indicates the manufacturer or designer of the appliance 100. The emblem 244 may be made from a molded plastic, and/or a molded metal. The emblem 244 may readable when upright, as illustrated in the example figures. Thus, the arm 208 that is aligned with the first aperture 202 and the hook 224 that is aligned with the second aperture 204 may place the emblem 244 in a readable orientation.

Advantageously, the badge for an appliance described herein allows for a more secure coupling between the appliance and the badge. Furthermore, the badge described herein allows for a sturdier connection with the appliance and avoids wiggling or looseness that consumers may correlate with a poorer quality appliance. Additionally, the badge described herein allows for a badge to present a readable emblem if the badge is coupled with the appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
- an external panel, wherein the external panel defines at least one aperture; and
- a badge coupled with the external panel, the badge comprising:
  - a rear surface that interfaces the external panel;
  - an arm coupled with the rear surface, the arm to be received by the at least one aperture, wherein the arm comprises:
    - at least one barb that provides tactile feedback;
    - a static member coupled with the rear surface;
    - a living hinge coupled with the static member; and
    - a dynamic member coupled with the living hinge, wherein the dynamic member comprises the at least one barb; and
  - at least one compression rib extending towards the external panel, wherein the at least one compression rib is coupled with the rear surface, wherein the at least one compression rib biases the badge away from the external panel.

2. The appliance of claim 1, wherein the static member is orthogonal with the rear surface.

3. The appliance of claim 2, wherein the dynamic member is nonparallel with the static member.

4. The appliance of claim 1, wherein the external panel defines a second aperture of the at least one aperture.

5. The appliance of claim 4, wherein the badge further comprises a hook coupled with the rear surface, wherein the hook is to be received by the second aperture of the at least one aperture of the external panel.

6. The appliance of claim 5, wherein the badge further comprises a front surface that indicates a brand of the appliance.

7. The appliance of claim 6, wherein the arm received by the at least one aperture and the hook received by the second aperture of the at least one aperture are aligned such that the front surface of the badge is vertically upright.

8. The appliance of claim 1, wherein the arm further comprises at least one fin, wherein the at least one fin compresses within the at least one aperture, and further wherein the at least one fin decompresses outside the at least one aperture such that the arm is secured within the at least one aperture.

9. The appliance of claim 1, wherein the at least one compression rib comprises a plurality of compression ribs arranged in an array proximal a periphery of the rear surface.

10. A badge for an appliance comprising an external panel defining at least one aperture, the badge comprising:
- a rear surface interfaced with the external panel of the appliance;
- an arm coupled with the rear surface, the arm comprising:
  - a static member coupled with the rear surface;
  - a living hinge coupled with the static member; and
  - a dynamic member coupled with the living hinge, wherein the dynamic member comprises at least one barb, wherein the at least one aperture of the external panel is configured to receive the arm; and
- at least one compression rib coupled with the rear surface and extending towards the external panel.

11. The badge of claim 10, wherein the arm further comprises a plurality of barbs, wherein the plurality of barbs received by the at least one aperture provides tactile feedback, and wherein the plurality of barbs at least partially secures the arm within the at least one aperture.

12. The badge of claim 10, wherein the arm further comprises a plurality of fins, wherein the plurality of fins compresses within the at least one aperture, and wherein the plurality of fins decompress outside the at least one aperture such that the arm is at least partially secured within the at least one aperture of the external panel of the appliance.

13. The badge of claim 10, wherein the dynamic member moves between a retracted position and an extended position, wherein the dynamic member in the extended position that is received within the at least one aperture at least partially secures the arm within the at least one aperture of the external panel of the appliance.

14. The badge of claim 10 further comprising a hook coupled with the rear surface, wherein the hook is configured to be received by a second aperture defined by the external panel of the appliance.

15. The badge of claim 14 further defining a front surface, wherein the front surface defines an inscribed brand.

16. The badge of claim 15, wherein the arm received by the at least one aperture is aligned with the hook received by the second aperture such that the inscribed brand of the front surface is vertically upright.

17. The badge of claim 14, wherein the hook further comprises a protrusion that at least partially secures the hook within the second aperture.

18. The badge of claim 10, wherein the at least one compression rib biases the badge away from the external panel of the appliance.

19. The badge of claim 18, wherein the at least one compression rib comprises a plurality of compression ribs arranged in an array proximal a periphery of the rear surface.

* * * * *